April 3, 1951 | L. M. CRAFT | 2,546,981
PULSING CIRCUIT
Filed June 15, 1945
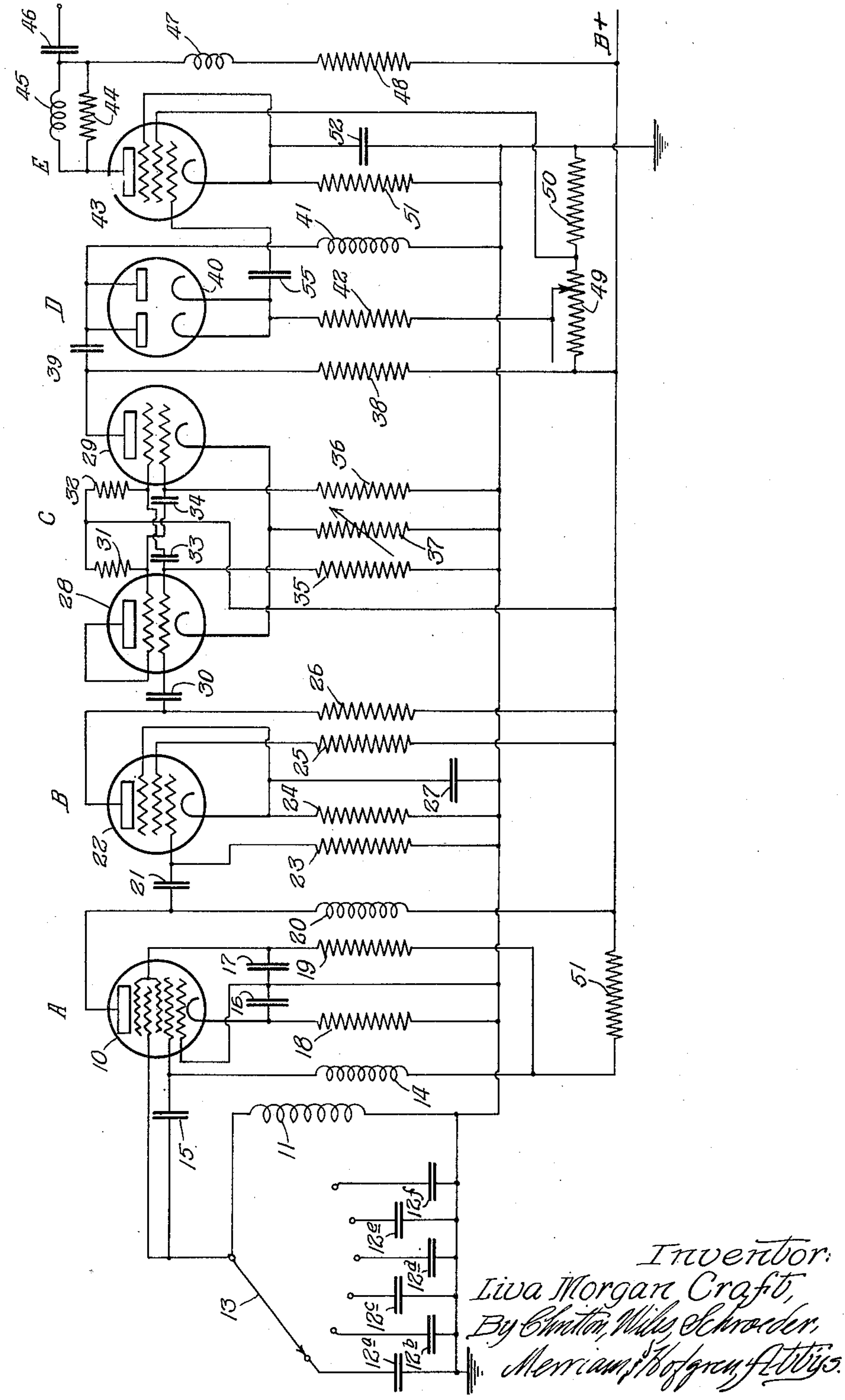
Inventor:
Liva Morgan Craft,
By Clinton, Wiles, Schroeder,
Merriam & Hofgren, Attys.

Patented Apr. 3, 1951

2,546,981

UNITED STATES PATENT OFFICE 2,546,981

PULSING CIRCUIT

Liva Morgan Craft, Cedar Rapids, Iowa, assignor to Collins Radio Company, a corporation of Iowa Application June 15, 1945, Serial No. 599,657

7 Claims. (Cl. 250—27)

This invention relates to a pulsing circuit, and more particularly to a circuit arrangement for generating periodic, very brief impulses at a desired frequency.

One feature of this invention is that it provides an improved impulse generator; another feature of this invention is that periodic impulses may be generated at fairly high frequencies; yet another feature of this invention is that the impulses may be of very brief duration, as only 1 or 2% of the period of one cycle at the impulse frequency; and yet another feature of this invention is that steep wave-front characteristics of the impulses may be retained in the output of the circuit. Other features and advantages of this invention will be apparent from the following specification and the drawing, which is a circuit diagram of one embodiment of my invention.

There are a number of applications in radio and allied fields where it is desirable to make use of periodic pulses of very brief duration and square wave form or steep wave-front characteristics, and this invention is directed to a circuit for generating such impulses. Provision of pulses of brief duration, as 10% or less of the duration of one cycle, presents quite a problem, particularly if the frequency desired is raised to a superaudible frequency. While in no way to be considered as limited to such use, the particular pulsing circuit shown and described in detail hereafter was designed to provide the operating or control pulses for a pulsing ultra-high frequency receiver. Such a radio receiving system is shown and described in Hansell Patent 2,267,732 of December 30, 1941, for example, and will not be further described here.

The specific embodiment of this invention here illustrated and described initially provides a wave at the desired frequency, a conventional oscillator being satisfactory for this purpose; and this wave, preferably amplified, is then delivered to and used to control the operation of a multivibrator having a natural frequency several times that of the oscillator frequency. The multivibrator is so designed that only the positive peak of the oscillator wave causes it to break into oscillation, and then it provides only one pulse at its frequency and ceases operation until affected by the positive peak of the next oscillator wave. If the multivibrator has a natural frequency of 150,000 cycles, and is energized by a 20,000 cycle oscillator wave, it will put out a positive pulse which is only $\frac{1}{15}$ the duration of one cycle at 20 kilocycles. This pulse, already of brief duration, is then passed through a rectifier so biased as to cut off all but the very peak of the pulse. If the rectifier is so biased that only $\frac{1}{4}$ (speaking from a standpoint of time duration) of the pulse is permitted to pass through it, it will be seen that the impulse in the output of the rectifier will have a frequency of 20,000 cycles but will be of a duration of less than 2% of the period of one cycle at such frequency. Then, in order to preserve the desired wave form and the steep wave-front characteristics necessarily present in an impulse of such brief duration at such frequency, these impulses are passed through a very wide-band amplifier, one capable of amplifying effectively all frequencies up to at least one megacycle and preferably up to three or four megacycles.

A multivibrator made with tubes and circuit elements of very low capacity (as acorn tubes) can be made to have a natural frequency above 150 kilocycles. A multivibrator built with what might be termed conventional tubes (as 6F6's) can be designed to have a natural frequency of about 150 kilocycles; and, with the system here disclosed, very brief impulses may be provided at frequencies up to 50,000 cycles or higher. If such a multivibrator is controlled by a 50 kilocycle wave, for example, the resulting positive pulses will have a duration of only $\frac{1}{6}$ of the period of one cycle at such frequency; and if the action of the rectifier is adjusted to pass current for only one quarter of the duration of such pulse (45° out of its 180°, speaking in terms of multivibrator frequency), it will be seen that the resultant impulse is still of such brief duration as to be only about 4% of the period of one cycle at the impulse frequency of 50 kilocycles. Moreover, if desired, the rectifier can be adjusted to cut off the peak of the pulse even closer to its instantaneous maximum, still further reducing the duration of the resulting impulses.

A conventional amplifier is completely incapable of amplifying such impulses while retaining their steep wave-front characteristics. It is necessary to amplify effectively a very wide band of frequencies in order that the output of the amplifier shall be a reasonably good reproduction of the relatively flat-topped, steep-sided impulse supplied to it. If the impulse be assumed to be of square wave form, Fourier analysis indicates that a similar amplified reproduction can be effected only if all of the harmonics, up to a quite high order, are efficiently amplified. That is, all harmonics up to at least the 30th harmonic, and preferably up to between the 40th and 60th harmonic, should be amplified to retain the characteristic shape of a wave approaching a square wave form, or at least having steep wave-front characteristics. I have found that an amplifier arrangement designed particularly for video work has sufficiently wide-band amplification characteristics for my purpose, being capable of efficiently amplifying all frequencies up to somewhere between three and four megacycles. This is highly desirable, as if the frequency of the impulses is 50 kilocycles, the amplifier must be capable of handling all frequencies up to at least one and a half megacycles (to handle properly all harmonics up to the 30th harmonic), and preferably up to three megacycles (to handle up to the 60th harmonic). The particular amplifying circuit shown here for this wide-band work is not claimed to be new per se, having been heretofore used in video work; but it is believed that its use for such a purpose as mine, and its ability faithfully to reproduce, in amplified form, impulses having steep wave-front characteristics, have not heretofore been appreciated.

In the particular embodiment of my invention illustrated herewith, an oscillator A generates waves, of conventional alternating current sine wave form, at a desired frequency. These waves are amplified in the portion B of the circuit, then used as the control for a multivibrator C designed to have a natural frequency several times that of the oscillator frequency, and so adjusted as to oscillate or pulse only once upon being "triggered" by the positive peak of the amplified oscillator wave. The pulses in the multivibrator C are delivered to a rectifier D, so biased as to pass only the peaks of such pulses, the form of the pulses in the multivibrator output being substantially that of the positive half of a sine wave. The resultant impulses, of brief duration, are then amplified in the wide-band amplifier identified in general as E.

Referring now more particularly to the oscillator A, the tube 10, which may be of the 6A8 type, has a frequency-determining tank circuit associated therewith which comprises the inductance 11 and a selected one of the fixed condensers here identified as 12_a—f_, selection being effected by a manually rotatable switch arm 13. An inductance of 2.5 millihenries, for example, associated with condensers of .008, .004, .002, .001, .0007, and .0005 microfarad capacity will provide oscillator frequencies (when the condensers are selectively used in the order given above) of 33, 50, 66, 75, 105 and 140 kilocycles. In the particular circuit arrangement shown, one of the grids of the tube 10 operates as the anode for oscillator purposes, the tube oscillating by virtue of coupling from this grid to a signal grid through condenser 15, this latter grid being connected to B through resistor 51 and an RF choke 14, which may for example have a value of 13 millihenries under the conditions assumed. The other connections and elements associated with the tube 10 are conventional for use of a tube of the type named for the purpose of an oscillator and amplifier. For example, the condensers 15, 16 and 17, respectively, may have values of .004, .01 and .1 microfarad; the cathode and B supply resistors 18, 19 and 51 may have values of 500 ohms, 400 ohms and 5,000 ohms, respectively; and the plate loading inductance 20 may have a value of 13 millihenries.

The output of the tube 10 is delivered through a coupling condenser 21, which may have a value of .002 microfarad, to the signal grid of an amplifying tube 22, which may be a 6AC7. This tube is arranged to amplify the wave generated in the oscillator portion of the circuit; and its circuit arrangement and the elements associated with it are conventional for a tube of the type named when intended as an amplifier. The grid resistor 23, the cathode resistor 24, the screen grid resistor 25, and the plate load resistor 26 may, for example, have values of 470,000, 200, 100,000, and 7,500 ohms, respectively; and the by-pass condenser 27 may have a value of .1 microfarad.

The multivibrator comprises a pair of tubes 28 and 29, which may be of the 6F6 type. The output of the amplifier B is delivered through the coupling condenser 30, which may have a capacity of .002 microfarad, to one of the grids of the tube 28; and the screen grid and plate of this tube are tied together and supplied with anode potential through the resistor 31, which may have a value of 20,000 ohms. A resistor 32, of the same value as the resistor 31, supplies voltage to the screen grid of the tube 29; but it will be noted that the plate of this latter tube is connected in a separate circuit to provide the output of the multivibrator. The signal grid of the tube 28 is connected to the screen grid of the tube 29 through a coupling condenser 33; and the screen grid and plate of the tube 28 are connected to the signal grid of the tube 29 through the condenser 34. The multivibrator arrangement also includes grid resistors 35 and 36, which may each have a value of 1,000 ohms; and a cathode resistor 37. The values of the condensers 33 and 34, and of the cathode resistor 37, are critical; and, to facilitate setting of this latter element at the correct value, it is preferably made variable. With the tubes described in the multivibrator, and the circuit element values heretofore mentioned, the use of a capacity of .0005 microfarad for each of the condensers 33 and 34 will result in the multivibrator having a natural period in the neighborhood of 150,000 cycles; and careful adjustment of the resistor 37 (to about 470 ohms in this case) will cause the multivibrator to oscillate or pulse just once each time it is affected or "triggered" by the positive peak of the wave delivered from the oscillator and amplifier. That is, when the signal grid of the tube 28 gets just above cut-off potential (and the resistor 37 should be so set that this occurs only at the very peak of the positive portion of the oscillator wave), the multivibrator breaks into operation and goes through the positive half of a wave at its natural frequency, then becoming inoperative (because the grid of the tube 28 is below cut-off level by such time) until the next positive peak of the oscillator wave.

The output of the tube 29 of the multivibrator C is developed across the plate load resistor 38, which may have a value of 2,400 ohms, and delivered through the coupling condenser 39 to a rectifier. This is here shown as a tube 40, of the 6H6 type, with its plates and cathodes connected together to operate in effect as a single cathode and a single anode. The output of the multivibrator is delivered to the plates of this tube 40, the tube being connected to ground by a radio frequency choke 41; and the cathodes are connected, through a cathode resistor 42 and a variable connection, to portion 49 of bleeder resistors here identified as 49 and 50, to provide an adjustable positive bias on the cathode of the tube 40. The adjustment of this bias is fairly critical, and it is for that reason made variable. As was discussed earlier, this bias should be so adjusted that only the upper or peak portion of the pulse delivered by the multivibrator is effective to actuate the rectifier and cause flow of current through the tube 40. It has been found quite satisfactory so to adjust this resistor that the rectifier passes current for only one-third to one-quarter of the duration of each pulse, the instantaneous voltage of the pulse in its initial and concluding stages being below the cut-off bias developed by the resistor 42.

The brief duration, steep wave-front impulse developed in this manner is delivered to the signal grid of a tube 43, which may be of the 6AG7 type, through a coupling condenser 55 blocking the D. C. bias on the rectifier cathode from this signal grid. As has been mentioned heretofore, it is important that this tube have very wide-band amplification characteristics, at least up to 30 times the initial frequency and preferably up to 50 or 60 times such frequency. A resistor 44 and an inductance 45 are connected in parallel between the plate of the tube 43 and the coupling condenser 46 delivering the output to any desired other circuit, as for example to the grid of a tube in a pulsing receiver of the kind shown in the aforesaid Hansell Patent 2,267,732; and these parallel elements 44 and 45 are connected to the source of positive B voltage through an inductance 47 and a resistor 48. Screen grid voltage may be supplied through a divider comprising the resistor portions 49 and 50, which may have a value of 7,500 ohms and 10,000 ohms; the cathode resistor 51 may have a value of 1,000 ohms; and the by-pass condenser 52 may have a value of 20 microfarads. In order to have a tube of the type named amplify efficiently from the low audible frequencies through a wide range up to or slightly beyond 3 megacycles, it has been found satisfactory to make the resistor 44 of 20,000 ohms; the inductance 45 of 250 microhenries; the inductance 47 of 125 microhenries; and the resistor 48 of 3,500 ohms. The output coupling condenser 46 may be of any value appropriate to the frequency being delivered, as for example .05 microfarad.

While I have shown and described certain embodiments of my invention, it is to be understood that it is capable of many modifications. Changes, therefore, in the construction and arrangement may be made without departing from the spirit and scope of the invention as disclosed in the appended claims.

I claim:

1. An impulse generator of the character described, including: means for generating pulses of a desired super-audible frequency and of a duration of substantially less than half of the period of one cycle at such frequency; means blocking all but a portion of each such pulse and passing said portion to provide impulses of a desired wave form and of briefer duration than said pulses; and a wide-band amplifier for amplifying said impulses.

2. An impulse generator of the character described, including: means for generating pulses of a desired frequency; a diode rectifier biased to pass only the peak portion of each positive pulse to provide impulses of a desired wave form having relatively flat tops and steep sides, and being of briefer duration than said pulses; and a wide-band amplifier for amplifying said impulses.

3. An impulse generator of the character described, including: means for generating pulses of a desired frequency in excess of 10,000 cycles per second and of a duration of substantially less than half of the period of one cycle at such frequency; a diode rectifier biased to pass only the peak portion of each positive pulse to provide impulses of a desired wave form having relatively flat tops and steep sides, and of briefer duration than said pulses; and a wide-band amplifier for amplifying said impulses.

4. An impulse generator of the character described, including: means providing a wave of a desired super-audible frequency; means affected by said wave for generating pulses of said desired frequency and of a duration of substantially less than half of the period of one cycle at such frequency; means passing only a portion of each such pulse to provide impulses of a desired substantially square topped wave form and of briefer duration than said pulses; and a wide-band amplifier for amplifying said impulses.

5. An impulse generator of the character described, including: means providing a wave of a desired frequency; a multivibrator affected by said wave for generating pulses of said desired frequency and of a duration of substantially less than half of the period of one cycle at such frequency; a rectifier biased to pass only the peak portion of each positive pulse to provide impulses of a desired substantially square topped wave form and of briefer duration than said pulses; and a wide-band amplifier for amplifying said impulses.

6. Apparatus of the character claimed in claim 3, wherein the amplifier is designed to efficiently amplify frequencies many times said frequency.

7. An impulse generator of the character described, including: means providing a wave of a desired frequency; a multivibrator affected by said wave and designed to operate at a frequency several times said frequency, the arrangement being such that said multivibrator delivers positive pulses at said frequency and of a duration comprising only a small fraction of the period of one cycle at such frequency; a rectifier biased to pass only the peak portion of each positive pulse to provide impulses of a desired substantially square topped wave form and of briefer duration than said pulses; and a wide-band amplifier for amplifying said impulses, this amplifier being designed to amplify efficiently frequencies many times said frequency.

LIVA MORGAN CRAFT.

REFERENCES CITED

The following references are of record in the file of this patent:

UNITED STATES PATENTS

| Number | Name | Date |
|---|---|---|
| 1,933,219 | Nakajima et al. | Oct. 31, 1933 |
| 2,097,334 | Bowman-Manifold | Oct. 26, 1937 |
| 2,118,626 | Smith | May 24, 1938 |
| 2,188,611 | Norton | Jan. 30, 1940 |
| 2,236,705 | Campbell | Apr. 1, 1941 |
| 2,277,000 | Bingley | Mar. 17, 1942 |
| 2,298,657 | Smith et al. | Oct. 13, 1942 |
| 2,399,135 | Miller et al. | Apr. 23, 1946 |
| 2,401,807 | Woff | June 11, 1946 |
| 2,413,182 | Hollingsworth et al. | Dec. 24, 1946 |
| 2,428,819 | Skellett | Oct. 14, 1947 |
| 2,430,725 | Miller | Nov. 11, 1947 |

OTHER REFERENCES

"Electrical Counting" by Lewis, MacMillan Co., 1943, pages 74–75.